US011997733B2

(12) United States Patent
Cherian et al.

(10) Patent No.: US 11,997,733 B2
(45) Date of Patent: May 28, 2024

(54) TRANSITIONING BETWEEN MULTI-LINK AND SINGLE-LINK MODE ON A TRANSMISSION OPPORTUNITY (TXOP) BASIS

(71) Applicant: QUALCOMM Incorporated, San Diego, CA (US)

(72) Inventors: George Cherian, San Diego, CA (US); Sai Yiu Duncan Ho, San Diego, CA (US); Abhishek Pramod Patil, San Diego, CA (US); Alfred Asterjadhi, San Diego, CA (US); Yanjun Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 17/330,257

(22) Filed: May 25, 2021

(65) Prior Publication Data

US 2021/0378039 A1 Dec. 2, 2021

Related U.S. Application Data

(60) Provisional application No. 63/030,770, filed on May 27, 2020.

(51) Int. Cl.
*H04W 76/15* (2018.01)
*H04W 8/24* (2009.01)
*H04W 74/0816* (2024.01)

(52) U.S. Cl.
CPC ............ *H04W 76/15* (2018.02); *H04W 8/24* (2013.01); *H04W 74/0816* (2013.01)

(58) Field of Classification Search
CPC ... H04W 76/15; H04W 8/24; H04W 74/0816; H04W 84/12; H04W 36/06; H04W 74/08
See application file for complete search history.

(56) References Cited

U.S. PATENT DOCUMENTS

2017/0105220 A1* 4/2017 Nakanishi ............... H04W 4/38
2018/0070270 A1* 3/2018 Li ........................... H04W 36/30
(Continued)

FOREIGN PATENT DOCUMENTS

CN 113453380 A * 9/2021 ........... H04L 1/0083

OTHER PUBLICATIONS

Guo J.Y., (Huawei Technologies Co Ltd) et al., "Multi Link SM Power Save Mode", IEEE Draft, 11-20-0760-00-00BE-Multi-Link-SM-Power-Save-Mode, IEEE-SA, Mentor, Piscatway, NJ USA, vol. 802.11 EHT, 802.11be, May 14, 2020 (May 14, 2020), pp. 1-9, XP068167902, Retrieved from the Internet: URL: https://mentor.ieee.org/802.11/dcn/20/11-20-0760-00-00be-multi-link-sm-power-save-mode.pptx. [Retrieved on May 14, 2020] p. 5-p. 6.
(Continued)

Primary Examiner — Saad A. Waqas
(74) Attorney, Agent, or Firm — MG-IP Law, P.C.

(57) ABSTRACT

Disclosed are techniques for wireless communication. In an aspect, an access point (AP) communicates with at least one wireless station (STA) and supporting a plurality of communication devices and communication modes on a communication medium, establishes a single-link communication mode with the at least one wireless STA and at least one communication device of the plurality of communication devices over a single-link, establishes a multi-link communication mode with the at least one wireless STA and the at least one communication device over a multi-link, and dynamically transitions between the single-link communication mode and the multi-link communication mode based upon a determination related to a best mode of delivery for a next period.

64 Claims, 9 Drawing Sheets

(56) References Cited

U.S. PATENT DOCUMENTS

| | | | | |
|---|---|---|---|---|
| 2019/0082373 A1* | 3/2019 | Patil | ...................... | H04L 1/1614 |
| 2019/0098565 A1* | 3/2019 | Cherian | .............. | H04W 40/244 |
| 2020/0163141 A1* | 5/2020 | Hsu | ................... | H04W 52/0209 |
| 2021/0067285 A1* | 3/2021 | Cariou | .................. | H04L 5/0053 |
| 2021/0076419 A1* | 3/2021 | Naribole | ............. | H04W 56/001 |
| 2021/0127420 A1* | 4/2021 | Lu | ..................... | H04W 74/0808 |
| 2021/0345403 A1* | 11/2021 | Kneckt | ............... | H04W 74/008 |

OTHER PUBLICATIONS

International Search Report and Written Opinion—PCT/US2021/034208—ISA/EPO—dated Oct. 5, 2021.

* cited by examiner

TRANSITIONING BETWEEN MULTI-LINK AND SINGLE-LINK MODE ON A TRANSMISSION OPPORTUNITY (TXOP) BASIS

CROSS-REFERENCE TO RELATED APPLICATIONS

The present Application for Patent claims the benefit of U.S. Provisional Application No. 63/030,770, entitled "A METHOD TO TRANSITION BETWEEN MULTI-LINK AND SINGLE-LINK MODE ON A TXOP BASIS," filed May 27, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by an access point (AP) includes communicating with at least one wireless station (STA) and supporting a plurality of communication devices and communication modes on a communication medium; establishing a single-link communication mode with the at least one wireless STA and at least one communication device of the plurality of communication devices over a single-link; establishing a multi-link communication mode with the at least one wireless STA and the at least one communication device over a multi-link; and dynamically transitioning between the single-link communication mode and the multi-link communication mode based upon a determination related to a best mode of delivery for a next period.

In an aspect, an access point (AP) includes a memory; at least one transceiver; and at least one processor communicatively coupled to the memory and the at least one transceiver, the at least one processor configured to: communicate, via the at least one transceiver, with at least one wireless station (STA) and supporting a plurality of communication devices and communication modes on a communication medium; establish a single-link communication mode with the at least one wireless STA and at least one communication device of the plurality of communication devices over a single-link; establish a multi-link communication mode with the at least one wireless STA and the at least one communication device over a multi-link; and dynamically transition between the single-link communication mode and the multi-link communication mode based upon a determination related to a best mode of delivery for a next period.

In an aspect, an access point (AP) includes means for communicating with at least one wireless station (STA) and supporting a plurality of communication devices and communication modes on a communication medium; means for establishing a single-link communication mode with the at least one wireless STA and at least one communication device of the plurality of communication devices over a single-link; means for establishing a multi-link communication mode with the at least one wireless STA and the at least one communication device over a multi-link; and means for dynamically transitioning between the single-link communication mode and the multi-link communication mode based upon a determination related to a best mode of delivery for a next period.

In an aspect, a non-transitory computer-readable medium storing computer-executable instructions that, when executed by an access point (AP), cause the AP to: communicate with at least one wireless station (STA) and supporting a plurality of communication devices and communication modes on a communication medium; establish a single-link communication mode with the at least one wireless STA and at least one communication device of the plurality of communication devices over a single-link; establish a multi-link communication mode with the at least one wireless STA and the at least one communication device over a multi-link; and dynamically transition between the single-link communication mode and the multi-link communication mode based upon a determination related to a best mode of delivery for a next period.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
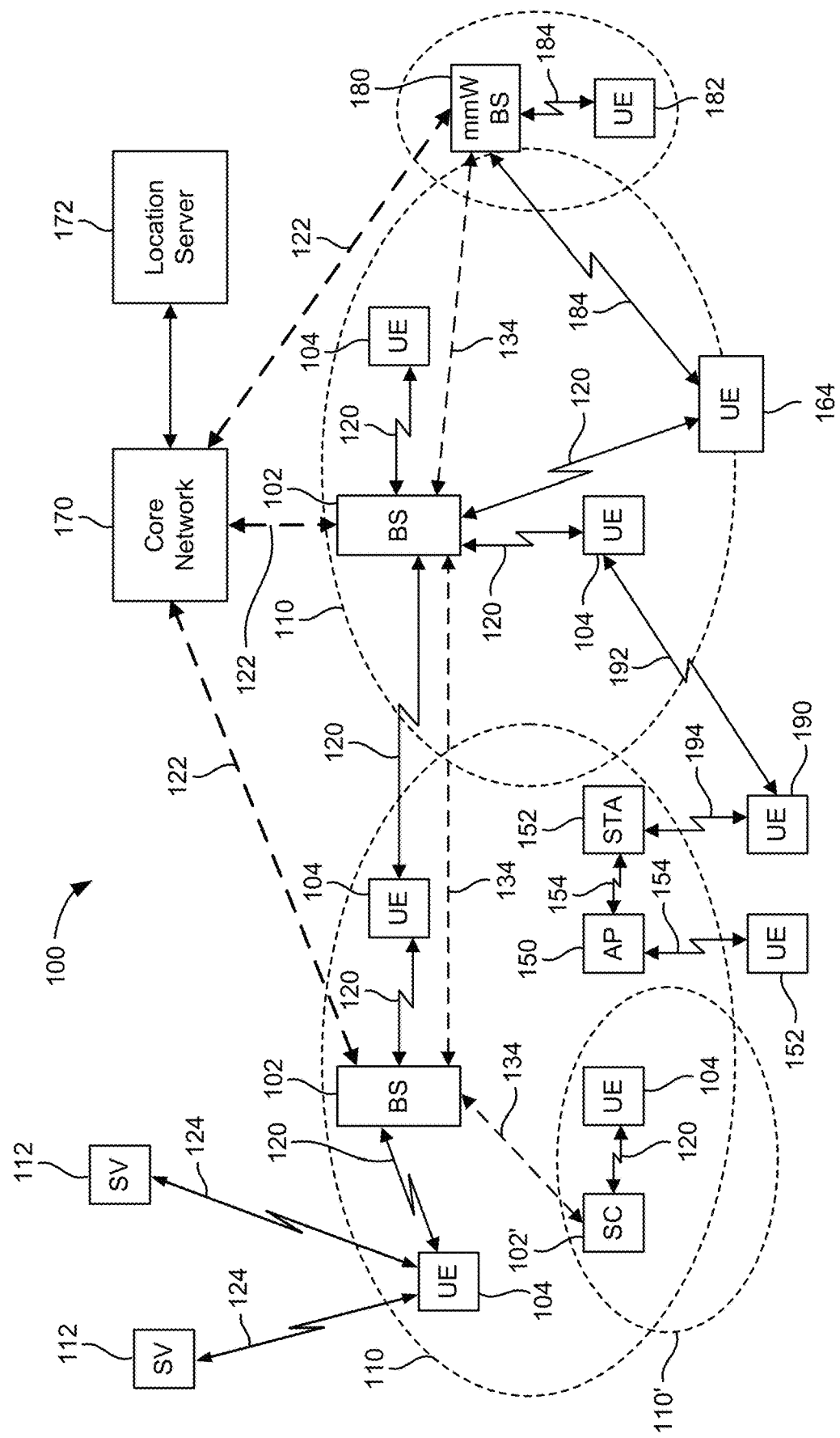
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more S Cells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
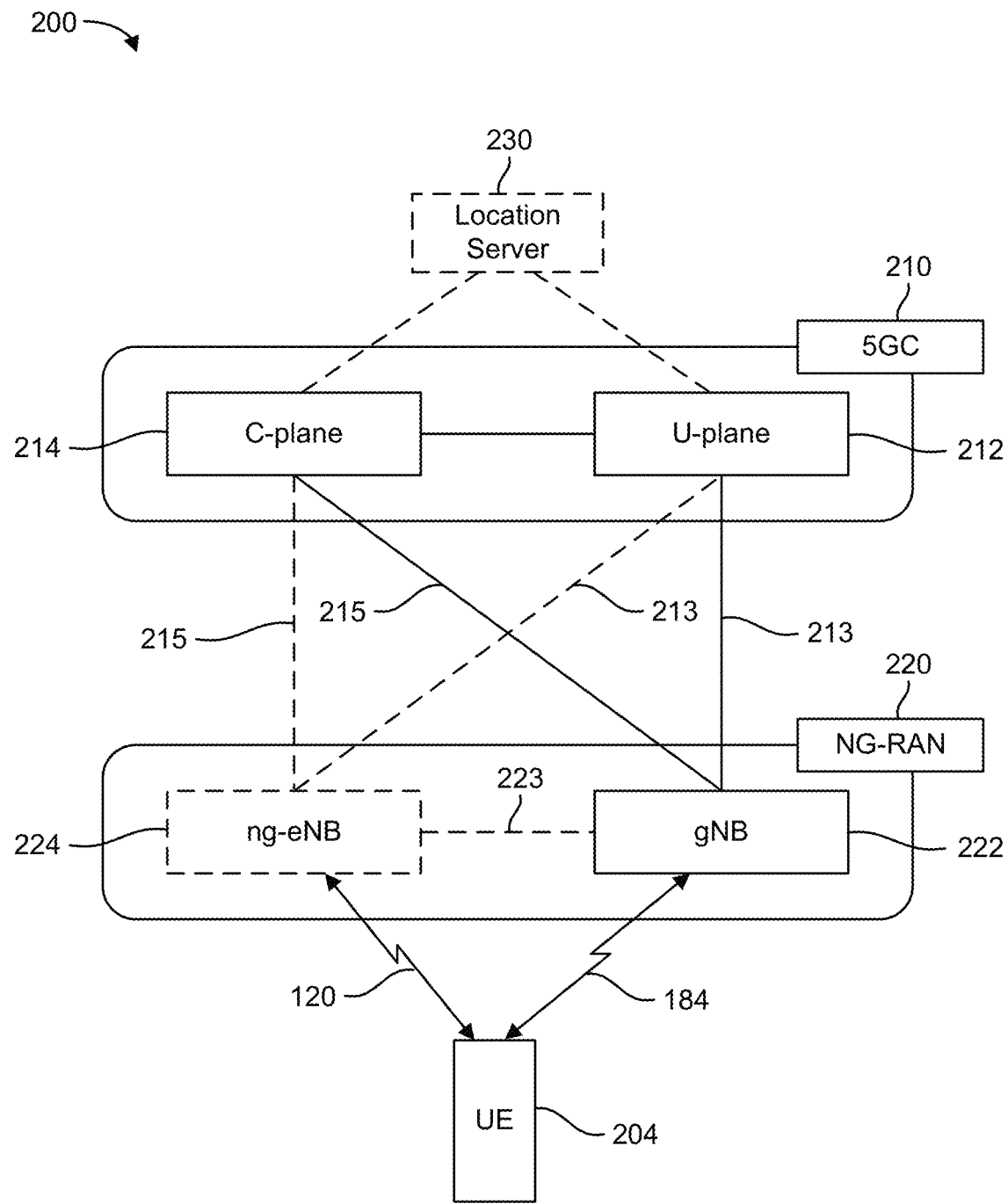
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
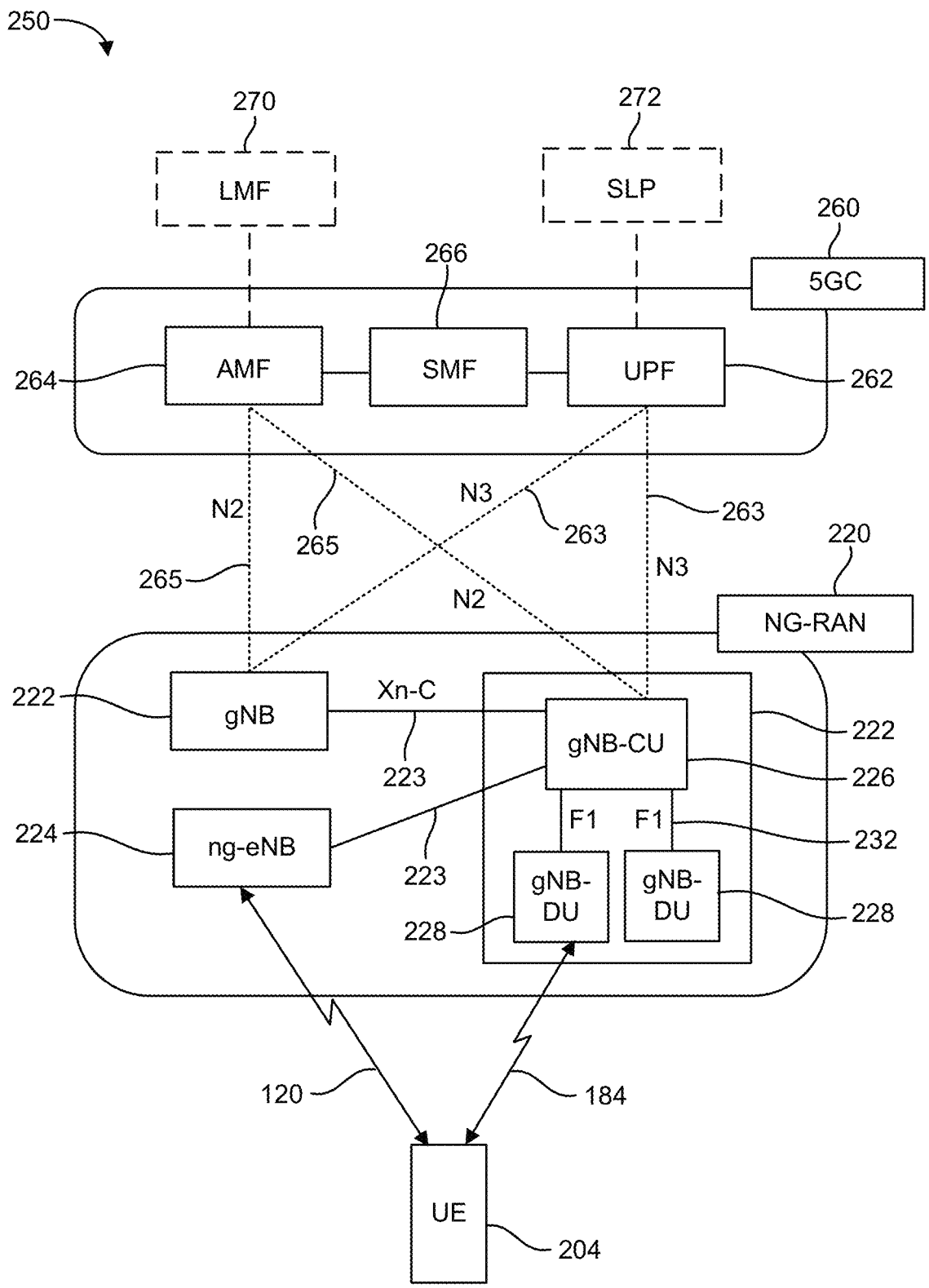

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
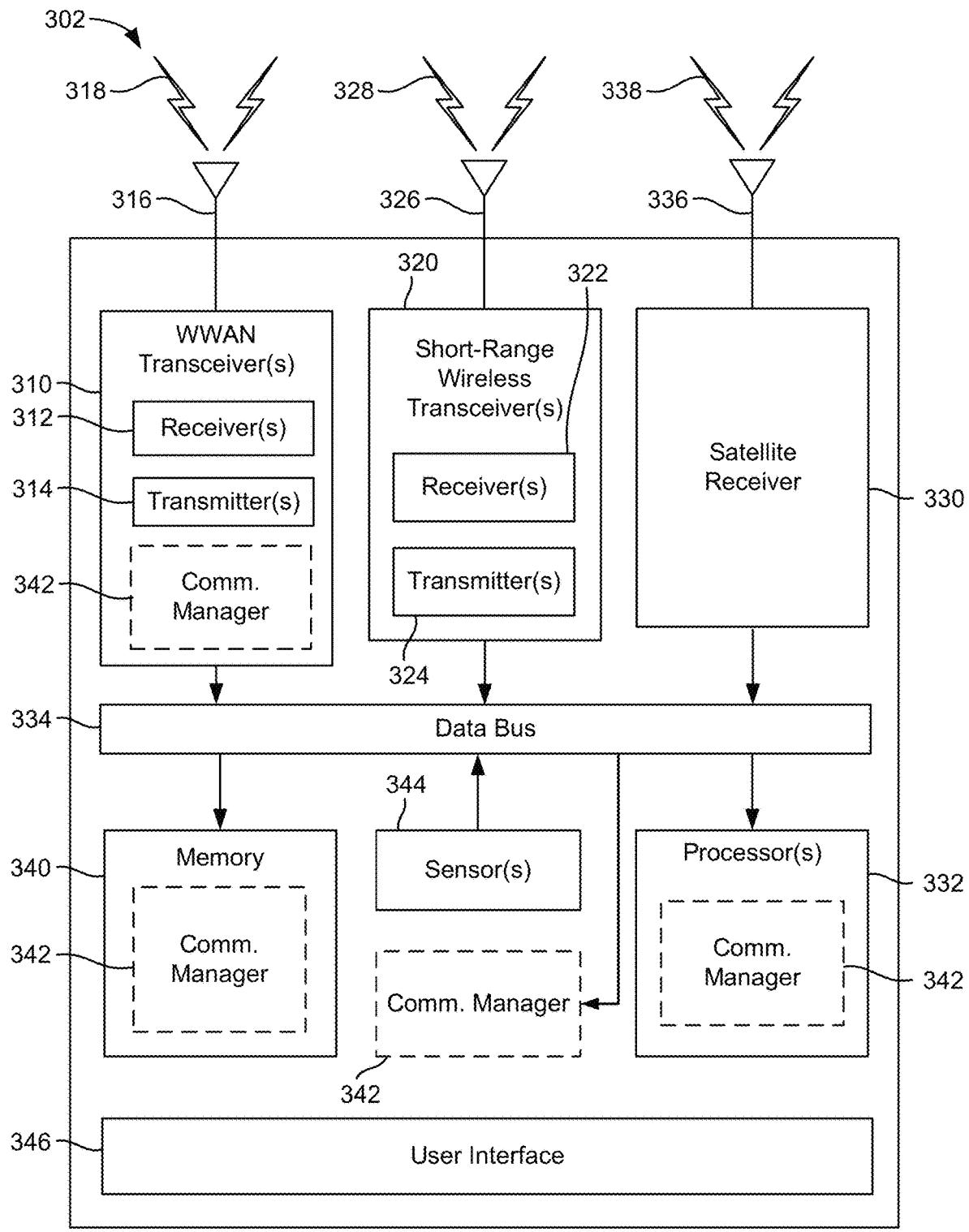
FIGS. 3A, 3B, and 3C are simplified block diagrams of several sample aspects of components that may be employed in a user equipment (UE), an access point, and a network entity, respectively, and configured to support communications as taught herein.
Figure 3B:
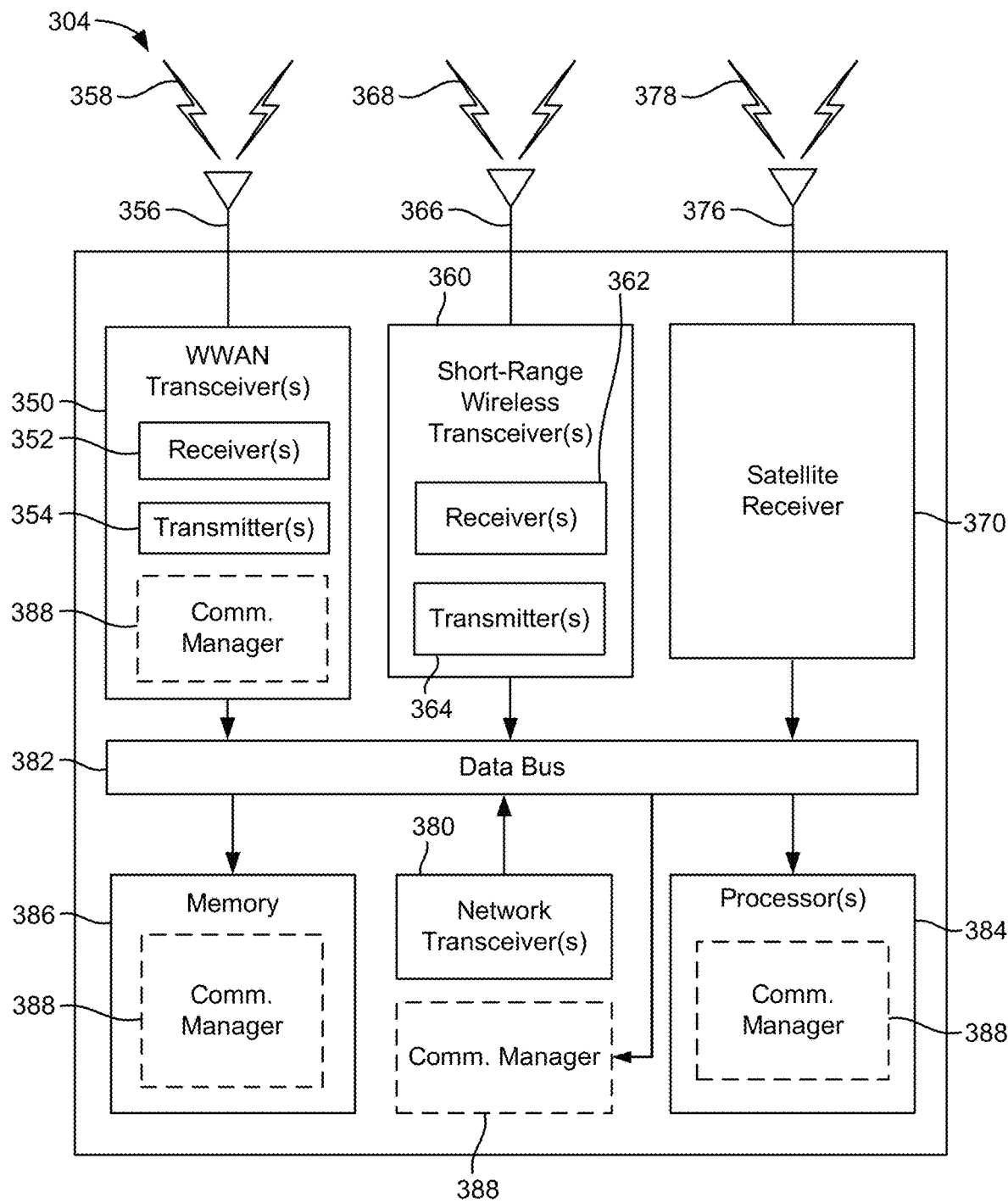
Figure 3C:
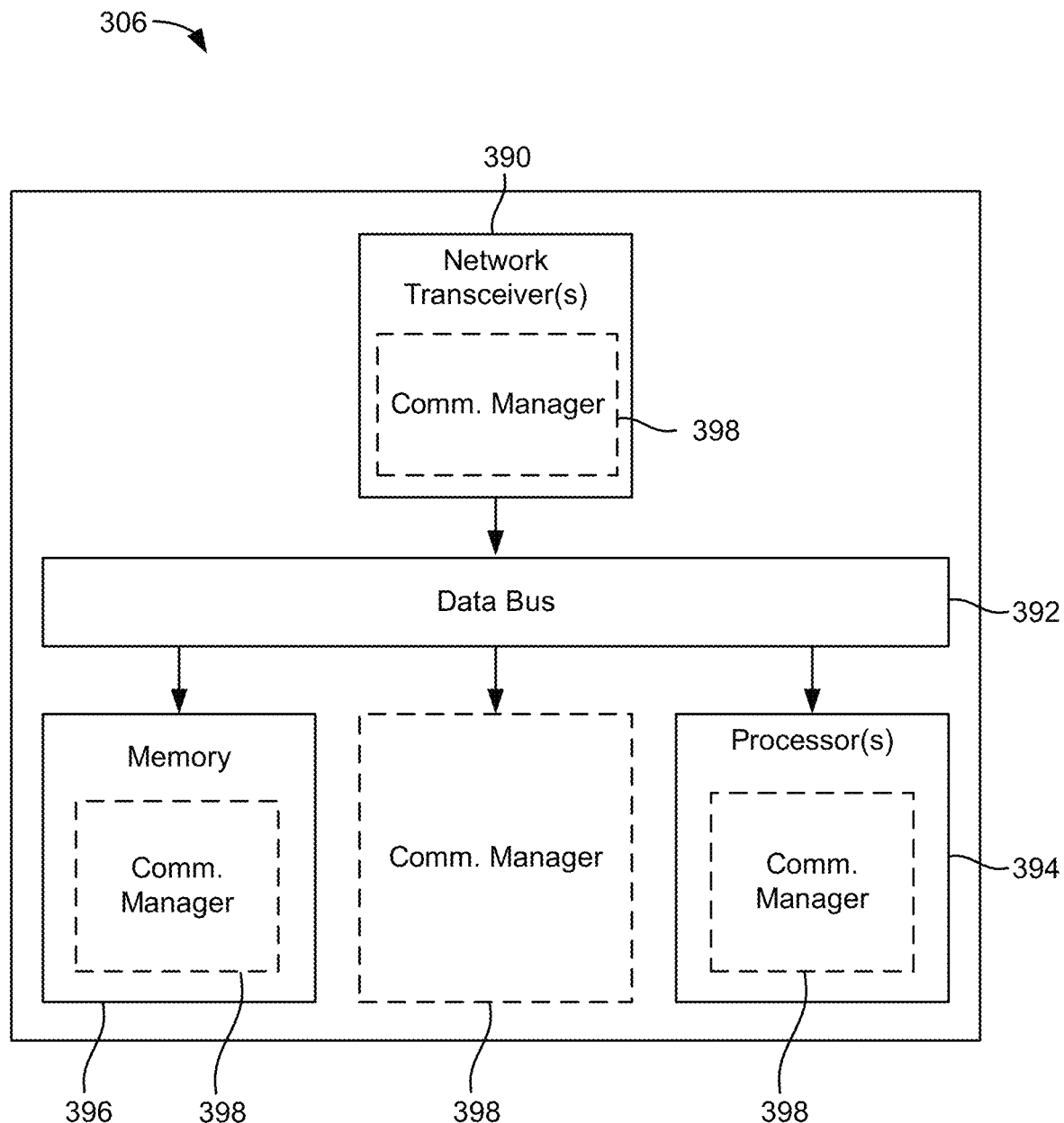

FIGS. 3A, 3B, and 3C illustrate several example components (represented by corresponding blocks) that may be incorporated into a UE 302 (which may correspond to any of the UEs described herein), an access point 304 (which may correspond to any of the base stations/access points described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the access point 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the access point 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the access point 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the access point 304, respectively, using measurements obtained by any suitable satellite positioning system algorithm.

The access point 304 and the network entity 306 each include one or more network transceivers 380 and 390, respectively, providing means for communicating (e.g., means for transmitting, means for receiving, etc.) with other network entities (e.g., other access points 304, other network entities 306). For example, the access point 304 may employ the one or more network transceivers 380 to communicate with other access points 304 or network entities 306 over one or more wired or wireless backhaul links. As another example, the network entity 306 may employ the one or more network transceivers 390 to communicate with one or more access point 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, access point 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, access point 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and an access point (e.g., access point 304) will generally relate to signaling via a wireless transceiver.

The UE 302, the access point 304, and the network entity 306 also include other components that may be used in conjunction with the operations as disclosed herein. The UE 302, the access point 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the access point 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the access point 304, and the network entity 306 may include communications manager 342, 388, and 398, respectively. The communications manager 342, 388, and 398 may be hardware circuits that are part of or coupled to the processors 332, 384, and 394, respectively, that, when executed, cause the UE 302, the access point 304, and the network entity 306 to perform the functionality described herein. In other aspects, the communications manager 342, 388, and 398 may be external to the processors 332, 384, and 394 (e.g., part of a modem processing system, integrated with another processing system, etc.). Alternatively, the communications manager 342, 388, and 398 may be memory modules stored in the memories 340, 386, and 396, respectively, that, when executed by the processors 332, 384, and 394 (or a modem processing system, another processing system, etc.), cause the UE 302, the access point 304, and the network entity 306 to perform the functionality described herein. FIG. 3A illustrates possible locations of the communications manager 342, which may be, for example, part of the one or more WWAN transceivers 310, the memory 340, the one or more processors 332, or any combination thereof, or may be a standalone component. FIG. 3B illustrates possible locations of the communications manager 388, which may be, for example, part of the one or more WWAN transceivers 350, the memory 386, the one or more processors 384, or any combination thereof, or may be a standalone component. FIG. 3C illustrates possible locations of the communications manager 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the access point 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the access point 304. These soft decisions may be based on channel estimates computed by a channel estimator. The soft decisions are then decoded and de-interleaved to recover the data and control signals that were originally transmitted by the access point 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the access point 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the access point 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the access point 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the access point 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the access point 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the access point 304, and the network entity 306 may be communicatively coupled to each other over data buses 334, 382, and 392, respectively. In an aspect, the data buses 334, 382, and 392 may form, or be part of, a communication interface of the UE 302, the access point 304, and the network entity 306, respectively. For example, where different logical entities are embodied in the same device (e.g., gNB and location server functionality incorporated into the same access point 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the access point 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by an access point," "by a network entity," etc. However, as will be appreciated, such operations, acts, and/or functions may actually be performed by specific components or combinations of components of the UE 302, access point 304, network entity 306, etc., such as the processors 332, 384, 394, the transceivers 310, 320, 350, and 360, the memories 340, 386, and 396, the communications manager 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the access point 304 or independently from the access point 304 (e.g., over a non-cellular communication link, such as WiFi).

Various aspects of the present disclosure provide techniques for multi-access point (multi-AP) scheduling and coordination in wireless local area networks (WLANs). The various aspects provide numerous technical advantages in accordance with the disclosure.

In some implementations, an AP may pair each of one or more first wireless devices with one or more corresponding second wireless devices in a manner that minimizes interference between uplink data transmissions from the first wireless devices and downlink data transmissions to the second wireless devices. In some implementations, the AP may select or group pairs of the first and second wireless devices for concurrent uplink and downlink communications with the AP based on received signal strength indication (RSSI) values measured by one or more of the first wireless devices, RSSI values measured by one or more of the second wireless devices, signal-to-interference-plus-noise ratio (SINR) values determined based on the measured RSSI values, path losses of the one or more first wireless devices relative to path losses of the one or more second wireless devices, or any other suitable values or parameters.

Particular implementations of the subject matter described in this disclosure can be implemented to realize one or more of the following technical advantages. By allowing an AP to receive uplink data from one or more first wireless devices concurrently with transmitting at least a portion of downlink data to one or more paired second wireless devices (or to transmit downlink data to the one or more second wireless devices concurrently with receiving at least a portion of the uplink data from the one or more paired first wireless devices), medium utilization and data throughput of a wireless network associated with the AP may be increased (such as compared with wireless networks formed by half-duplex APs) without configuring or modifying the first wireless devices or the second wireless devices to operate as full duplex devices.

In addition, the ability of an AP to receive uplink data from some wireless devices on a first channel concurrently with transmitting downlink data to other wireless devices on a second channel (which may be different from the first channel) can allow the AP to communicate with a respective client device using a plurality of different channels or communication links available to a wireless network, which may also increase data throughput of the wireless network. In some implementations, the AP may use multi-link aggregation (MLA) techniques to aggregate multiple channels or sub-channels for one or both of uplink and downlink transmissions. Further, because the AP may select pairs of wireless devices for concurrent uplink and downlink communications based on one or more of RSSI values, SINR values, or other indicators of interference between the uplink channels and the downlink channels, various aspects of the subject matter disclosed herein may be used to reduce cross-interference associated with multi-link aggregation.

The term "full-duplex communications" may refer to an AP receiving uplink data from one or more first wireless devices on a first wireless channel concurrently with transmitting downlink data to one or more second wireless devices on a wireless second channel, where the first and second wireless channels may be the same wireless channel or may be different wireless channels. Specifically, in some implementations, the first and second wireless channels may be the same wireless channel or wireless link (such that the first and second wireless channels span similar frequency ranges). In other implementations, the first and second wireless channels may be located in different frequency bands (such as the first wireless channel located in the 5 GHz frequency band and the second wireless channel located in the 6 GHz frequency band). In some other implementations, the first and second wireless channels may be located in different portions of the same frequency band (such as the first wireless channel located in a lower portion of the 5 GHz frequency band and the second wireless channel located in an upper portion of the 5 GHz frequency band, the first wireless channel located in a lower portion of the 2.4 GHz frequency band and the second wireless channel located in an upper portion of the 2.4 GHz frequency band, and so on). In some implementations, each of the first and second wireless devices may include filtering capabilities sufficient to isolate the first and second wireless channels from each other.

Various implementations relate generally to facilitating concurrent uplink and downlink communications by one or more APs associated with a wireless network. Some implementations more specifically relate to receiving uplink data from one or more first wireless devices (such as one or more STAs) concurrently with transmitting downlink data (or at least a portion thereof) to one or more second wireless devices (such as one or more other STAs) while allowing the first and second wireless devices to operate as half-duplex devices. Similarly, some other implementations more specifically relate to transmitting downlink data to one or more second wireless devices concurrently with receiving uplink data (or at least a portion thereof) from one or more first wireless devices while allowing the first and second wireless devices to operate as half-duplex devices. In some implementations, the AP may reuse portions of the wireless medium initially allocated to one or more first wireless devices for uplink transmissions by re-allocating the portions of the wireless medium for downlink transmissions to one or more second wireless devices. In some aspects, the AP may duplex portions of the wireless medium occupied by relatively low data-rate uplink transmissions, and may transmit relatively high data-rate downlink communications to the second STAs concurrently with receiving at least a portion of the uplink data from the first wireless devices.

A WLAN may include one or more APs that provide a shared wireless medium for use by a number of client devices. Each AP, which may correspond to a Basic Service Set (BSS), periodically broadcasts beacon frames to enable compatible client devices within wireless range of the AP to establish and maintain a communication link with the WLAN. A plurality of APs may be connected together to form an extended Basic Service Set (ESS). WLANs that operate in accordance with the IEEE 802.11 family of standards are commonly referred to as Wi-Fi networks, and client devices that communicate with an AP in a Wi-Fi network may be referred to as wireless STAs. Many APs and STAs are capable of operating on a number of different frequencies including, for example, the 2.4 GHz frequency, the 5 GHz frequency, and the 60 GHz frequency.

A WLAN (also known as a Wi-Fi network) may include an AP and multiple associated STAs that may communicate via wireless links. Multiple STAs may represent devices, such as mobile stations, personal digital assistants (PDAs), other handheld devices, netbooks, notebook computers, tablet computers, laptops, display devices (e.g., televisions, computer monitors, etc.), printers, etc.

As described above, a communication device (e.g., UE 302, access point 304) may include a receiver (e.g., receiver(s) 322, 362), a communications manager (e.g., communications manager 342, 388, 398), and a transmitter (e.g., transmitter(s) 324, 364). The communication device may also include a processor (e.g., processor(s) 332, 384). Each of these components may be in communication with one another (e.g., via one or more buses, such as data buses 334, 382).

As described above, a receiver may receive information such as packets, user data, and/or control information associated with various information channels (e.g., control channels, data channels, and information related to multi-access point scheduling in wireless local area networks, etc.). Information may be passed on to other components of the device. The receiver may be a transceiver (e.g., transceiver(s) 320, 350). The receiver may utilize a single antenna, a set of antennas, or any type of antenna array setup (e.g., antennas 326, 366).

In one example scenario, while operating in a single-link mode, at least two antennas are switched to the single-link when transitioning to the single-link mode. In another scenario, both of the at least two antennas are mapped to the same single-link. In another scenario, while operating in a multi-link mode, one of the at least two antennas is mapped to each link of the multi-link.

A communications manager (e.g., communications manager 342, 388) may win a contention-based procedure (e.g., LBT, CCA) for a transmission opportunity (TxOP) of a wireless channel, transmit to at least a second AP, during a first portion of the TxOP, a first resource assignment for coordinated communications between the second AP and at least a first STA during a second portion of the TxOP, transmit to at least the second AP an indication of a start of the second portion of the TxOP, and initiate, based on the indication, coordinated communications between the first AP and at least a second STA associated with the first AP during the second portion of the TxOP.

The communications manager may also receive, during a first portion of a TxOP reserved for communications by a first AP, a resource assignment from the first AP to schedule coordinated communications over a second portion of the TxOP. There may also be a transmitting of a scheduling indicator to at least one STA associated with the second access point scheduling a subset of resources of the second portion of the TxOP for the coordinated communications indicated in the resource assignment, receive an indication of a start of the second portion of the TxOP, and initiate, based on the indication, coordinated communications between the second AP and the at least one STA during the second portion of the TxOP.

In some cases, the communications manager may also configure a multi-AP physical protocol data unit (MAP PPDU) for transmission to schedule coordinated communications with at least one STA. It may also transmit the MAP PPDU transmission upon reception of an indication of a start of a second portion of a TxOP. It then communicates with the STA based on the MAP PPDU transmission, transmits to at least a second AP an indication of a start of a second portion of a TxOP reserved for communications by the first AP, initiate, based on the indication, coordinated communications between the first AP and at least one STA associated with the first AP during the second portion of the TxOP, receive an indication of a start of a second portion of a TxOP reserved for communications by a first AP, and initiate, based on the indication, coordinated communications between the second AP and at least one STA during the second portion of the TxOP.

Those skilled in the art will appreciate that a communications manager, or its sub-components, may be implemented in hardware, code (e.g., software or firmware) executed by a processor, or any combination thereof. If implemented in code executed by a processor, the functions of the communications manager, or those of its sub-components may be executed by a general-purpose processor, a DSP, an ASIC, a FPGA or other programmable logic device, discrete gate or transistor logic, discrete hardware components, or any combination thereof designed to perform the functions described in the present disclosure.

A communications manager, or its sub-components, may be physically located at various positions, including being distributed such that portions of functions are implemented at different physical locations by one or more physical components. In some examples, the communications manager, or its sub-components, may be a separate and distinct component in accordance with various aspects of the present disclosure. In some examples, the communications manager, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

A transmitter may transmit signals generated by other components of the device. In some examples, the transmitter may be collocated with a receiver in a transceiver module.

The transmitter may utilize a single antenna, a set of antennas or any type of antenna array setup.

In some examples, the communications manager may be a wireless modem implemented as a separate chipset or as a component of a system on chip (SoC), and the receiver and transmitter may include analog components (e.g., amplifiers, filters, phase shifters, antennas, etc.) to facilitate the receipt and transmission of wireless signals. The communications manager may obtain and decode signals received wirelessly from the receiver via a receive interface. The communications manager also may output signals for wireless transmission by the transmitter over a transmit interface.

A communication device may support multi-access point scheduling in wireless local area networks in accordance with aspects of the present disclosure. The communication device may include a receiver, a communications manager, and a transmitter. The device may also include a processor. Each of these components may be in communication with one another (e.g., via one or more buses). The coupling of the communication devices may be wired, wireless, or any combination thereof.

A receiver may receive information in many different forms and formats. Examples include packets, user data, or control information associated with various information channels (e.g., control channels, data channels, and information related to multi-access point scheduling in wireless local area networks, etc.). Information may be passed on to other components of the device.

A communications manager may include a channel contention manager, a resource assignment manager, a multi-AP transmission manager, a coordinated communications manager, and a scheduling manager. The channel contention manager may win a contention-based procedure (e.g., CCA, LBT) for a TxOP of a wireless channel.

A resource assignment manager may transmit to at least a second AP, during a first portion of the TxOP, a first resource assignment for coordinated communications between the second AP and at least a first STA during a second portion of the TxOP. In some cases, the resource assignment manager may receive, during the first portion of a TxOP reserved for communications by a first AP, a resource assignment from the first AP to schedule coordinated communications over a second portion of the TxOP.

In some cases, the resource assignment manager may transmit to at least a second AP an indication of a start of a second portion of a TxOP reserved for communications by the first AP. In some cases, the resource assignment manager may receive an indication of a start of a second portion of a TxOP reserved for communications by a first AP.

The multi-AP transmission manager may transmit to at least the second AP an indication of a start of the second portion of the TxOP. In some cases, the multi-AP transmission manager may receive an indication of a start of the second portion of the TxOP.

The coordinated communications manager may initiate based on the received indication, coordinated communications between the first AP and at least a second STA associated with the first AP during the second portion of the TxOP. In some cases, the coordinated communications manager may initiate, based on the indication, coordinated communications between the second AP and the at least one STA during the second portion of the TxOP. In some cases, the coordinated communications manager may transmit the MAP PPDU transmission upon reception of an indication of a start of a second portion of a TxOP and communicate with the STA based on the MAP PPDU transmission.

The scheduling manager may transmit a scheduling indicator to at least one STA associated with the second AP scheduling a subset of resources of the second portion of the TxOP for the coordinated communications indicated in the resource assignment. In some cases, the scheduling manager may configure a MAP PPDU transmission to schedule coordinated communications with at least one STA.

A transmitter may transmit signals generated by other components of the device. In some examples, the transmitter may be collocated with a receiver in a transceiver module.

As described above, a communications manager may include a channel contention manager, a resource assignment manager, a multi-AP transmission manager, a coordinated communications manager, a resource mapping component, a scheduling manager, and a sub-channel resource manager. Each of these modules may communicate, directly or indirectly, with one another (e.g., via one or more buses). A channel contention manager may win a contention-based procedure for a TxOP of a wireless channel.

A resource assignment manager may transmit to at least a second AP, during a first portion of the TxOP, a first resource assignment for coordinated communications between the second AP and at least a first STA during a second portion of the TxOP. In some examples, the resource assignment manager may transmit to at least a second AP an indication of a start of a second portion of a TxOP reserved for communications by the first AP. In some examples, the resource assignment manager may transmit to a third AP and based on the first scheduling indicator, a second resource assignment for coordinated communications between the third AP and at least a third STA during the second portion of the TxOP.

In some examples, the resource assignment manager may configure the resource assignment in a single user physical protocol data unit (SU PPDU) format. In some examples, the resource assignment manager may transmit the resource assignment allocating resources for coordinated communications between the second AP at least a first STA, and between a third AP and at least a third STA. In some examples, the resource assignment manager may configure the resource assignment to include an AP identifier and corresponding resources of the second portion of the TxOP for at least the second AP. The multi-AP transmission manager may transmit to at least the second AP an indication of a start of the second portion of the TxOP.

In some examples, the resource assignment manager may receive, during a first portion of a TxOP reserved for communications by a first AP, a resource assignment from the first AP to schedule coordinated communications over a second portion of the TxOP. In some examples, the resource assignment manager may receive an indication of a start of a second portion of a TxOP reserved for communications by a first AP, and may receive an indication of a start of the second portion of the TxOP.

In some examples, the multi-AP transmission manager may receive a first scheduling indicator from the second AP based on the first resource assignment. In some examples, the multi-AP transmission manager may receive a second scheduling indicator from the third AP based on the second resource assignment.

An AP and its associated STAs may represent a BSS or an ESS. Various STAs in the network may be able to communicate with one another through the AP. An extended network station associated with the WLAN may be connected to a wired or wireless distribution system that may allow multiple APs to connect in an ESS. An AP may coordinate with one or more neighboring APs to provide coordinated communications during a TxOP.

WLAN protocol data units (PDUs) may be transmitted over different radio frequency spectrum bands. Some examples may include multiple sub-bands or frequency channels. In one example, the radio frequency spectrum band may have a bandwidth of 80 MHz, and each of the sub-bands or channels may have a bandwidth of 20 MHz. Please note that different bandwidths and frequencies may be implemented without departing from the spirit and scope of the present disclosure.

Transmissions to and from communication devices may include control information within a header that is transmitted prior to data transmissions. The information provided in a header is used by a receiving device to decode the subsequent data. The legacy preamble may be used for packet detection, automatic gain control and channel estimation, among other uses. The legacy preamble may also be used to maintain compatibility with legacy devices.

In some aspects, wireless communication systems may be configured to support multi-user (MU) transmissions where multiple APs perform wireless communications with their associated wireless STAs during a TxOP. For example, a first AP (e.g., a master AP) may obtain or otherwise secure access to a channel for the TxOP. The channel TxOP may have available resources beyond what the master AP needs to perform its wireless communications. Accordingly, the master AP may generally transmit or otherwise signal an indication to second AP(s) (e.g., slave or neighboring AP(s)) that the resources are available for use during the TxOP. The second AP(s) may generally perform wireless communications using the unused resources during the TxOP.

In one example, a master AP (e.g., the first AP) may obtain or otherwise secure access to a shared or unlicensed radio frequency spectrum band for a TxOP. The master AP may perform an LBT procedure to obtain access to the channel for the TxOP. In some aspects, the channel may be a wideband channel and/or the TxOP may have a temporal duration such that the available resources for use during the TxOP are more than the master AP needs for operation.

An first AP may transmit, to a second AP and during a first portion of a TxOP, a request to participate in a multi-user (MU) transmission. A TxOp may be adjusted in various ways. For example, the TxOp may be adjusted to increase its duration, or to adjust access priority.

A master AP may transmit or otherwise provide an indication of a request to participate (or an invitation to participate) in the MU transmission during the TxOP to its neighboring AP(s). In another scenario, one or more of the neighboring AP(s) (e.g., one or more second AP(s), which may also be referred to as slave AP(s)) may receive the request to participate and determine that they have communications to exchange with their associated wireless STA(s). Each of the one or more neighboring AP(s) may determine (based on the data being available for communication) what resources are needed for them to communicate the data during the TxOP.

Accordingly, each of the one or more neighboring AP(s) may respond by transmitting or otherwise providing an indication of intent to participate in the MU transmission to the master AP. Generally, the indication of intent to participate may also carry or otherwise convey an indication of the resources that the neighboring AP is requesting for the MU transmission. A master AP may transmit or otherwise provide an indication of a trigger signal that carries or otherwise conveys an indication of resources for the neighboring AP(s) to use during the MU transmission (e.g., a resource grant or allocation). The master AP and the neighboring AP(s) may participate in the MU transmission with their respective wireless STAs.

Each of the APs in a communication network may contend for access to a wireless channel during a contention/countdown window. In some cases, the first AP may be the first to contend for channel access and may win the medium. Other APs may attempt to access the channel before the first AP wins contention, but the final outcome is that they may not win contention.

The AP may receive, from the second AP and during the first portion of the TxOP, an indication of intent to participate in the MU transmission during the second portion of the TxOP, the indication of intent including a resource request of the second AP for participation in the MU transmission. The AP may transmit, during an initial period of the second portion of the TxOP, a trigger signal to the second AP indicating a set of one or more resources for the second AP during the MU transmission. The AP may participate, in conjunction with the second AP and during the second portion of the TxOP, in the MU transmission.

In some aspects of the disclosure, multi-AP scheduling is provided, in which a first AP may gain channel access for a TxOP, and may coordinate with at least a second AP to allow both the first AP and the second AP to transmit and receive wireless communications during the TxOP. In further aspects of the disclosure, a physical protocol data unit (PPDU) for multi-AP coordination is provided, which may carry information related to scheduling and transmission resources for coordination of concurrent transmissions by multiple APs. In still further aspects of the disclosure, techniques for orthogonal frequency division multiple access (OFDMA) are provided in which multiple APs may concurrently communicate with one or more associated STAs using one or more wireless channels.

In some cases, a first AP may gain channel access for a TxOP, and may coordinate with at least a second AP to allow both the first AP and the second AP to transmit and receive wireless communications during the TxOP. The first AP may be referred to as a TxOP owner, or leader AP, in accordance with various aspects of the disclosure. In some cases, the first AP, upon gaining channel access (e.g., following a successful contention-based channel access procedure), may initiate a scheduling phase with the second AP to schedule of resources within the TxOP for the first and second AP. The first AP may initiate a multi-AP coordinated transmission phase following the scheduling phase, during which both the first AP and second AP may communicate with one or more associated STAs.

The multi-link operation (MLO) mode of IEEE 802.11be supports sending the PPDUs on more than one link. However, based on the band/channel separation and filter performance, there may be various restrictions regarding the manner in which PPDUs are sent on each of the links.

There are three example modes of transmission that will be considered. The first mode of transmission under consideration is a Basic mode that includes a Multi-Primary with a single-link transmission. In this situation, the STA/AP counts down on both links. A transmission is sent only on the link that wins the medium. Other links are blocked by in-device-interference that exceeds a certain threshold (e.g. greater than −62 dBm). There are no resulting aggregation gains obtained during this mode of operation.

The second mode of transmission under consideration is a Synchronous mode that includes a STA and an AP that performs a temporal countdown on both links. The PPDU start/end can occur independently on each link. One example scenario is when the device can support simultaneous Tx/Rx (e.g., on operating modes of 2.4 GHz and 5 GHz). However, the aggregation of these two example 5 GHz and 6 GHz operating modes would require costly RF filters and may not be a feasible implementation for many client side devices.

The third mode of transmission under consideration is a Synchronous PPDU mode that includes a STA/AP that performs a temporal count down on both links. If the first link wins the transmission rights to the transmission medium, both links are able to then transmit PDDUs at the same time. In this mode, the aggregation of these two example 5 GHz and 6 GHz operating modes would not require a costly RF filter. This mode would also provide gains in both latency and aggregation.

In one example, a first AP may gain channel access for a TxOP, and may coordinate with at least a second AP to allow both the first AP and the second AP to transmit and receive wireless communications during the TxOP. In further aspects of the disclosure, a PPDU for multi-AP coordination is provided, which may carry information related to scheduling and transmission resources for coordination of concurrent transmissions by multiple APs.

In another example, a first AP may gain channel access for a TxOP, and may coordinate with at least a second AP to allow both the first AP and the second AP to transmit and receive wireless communications during the TxOP. The first AP may be referred to as a TxOP owner (or a leader AP). In some cases, the first AP gains channel access by following a successful contention-based channel access procedure. It may also initiate a scheduling phase with the second AP to schedule resources within the TxOP for the first and second AP. The first AP may initiate a multi-AP coordinated transmission phase following the scheduling phase, during which both the first AP and second AP may communicate with one or more associated STAs.

In another scenario an AP multi-link device (MLD) is configured to operate at both 1) a 320 MHz operating bandwidth on a 6 GHz operating mode and 2) a 160 MHz operating bandwidth on a 5 GHz operating mode. In another scenario (Non-AP MLD), a capability exists to support either 1) a multi-link operation (MLO) mode of a 160 MHz operating bandwidth on a 5 GHz operating mode and a 160 MHz operating bandwidth on a 6 GHz operating mode; or 2) a single-link mode of 320 MHz operating bandwidth on a 6 GHz operating mode. There is an operational probability that the 6 GHz operating mode may be free most of the time compared to a 5 GHz operating mode.

Another scenario could be the non-AP MLD operating at 160 MHz operating bandwidth on a 5 GHz operating mode in conjunction with a 320 MHz operating bandwidth on a 5 GHz operating mode in single-link mode.

In one aspect, techniques are disclosed to enable the ability to dynamically switch between a single-link mode and a multi-link mode so that in aggregate, the best of both operation modes may be obtained.

Figure 4:
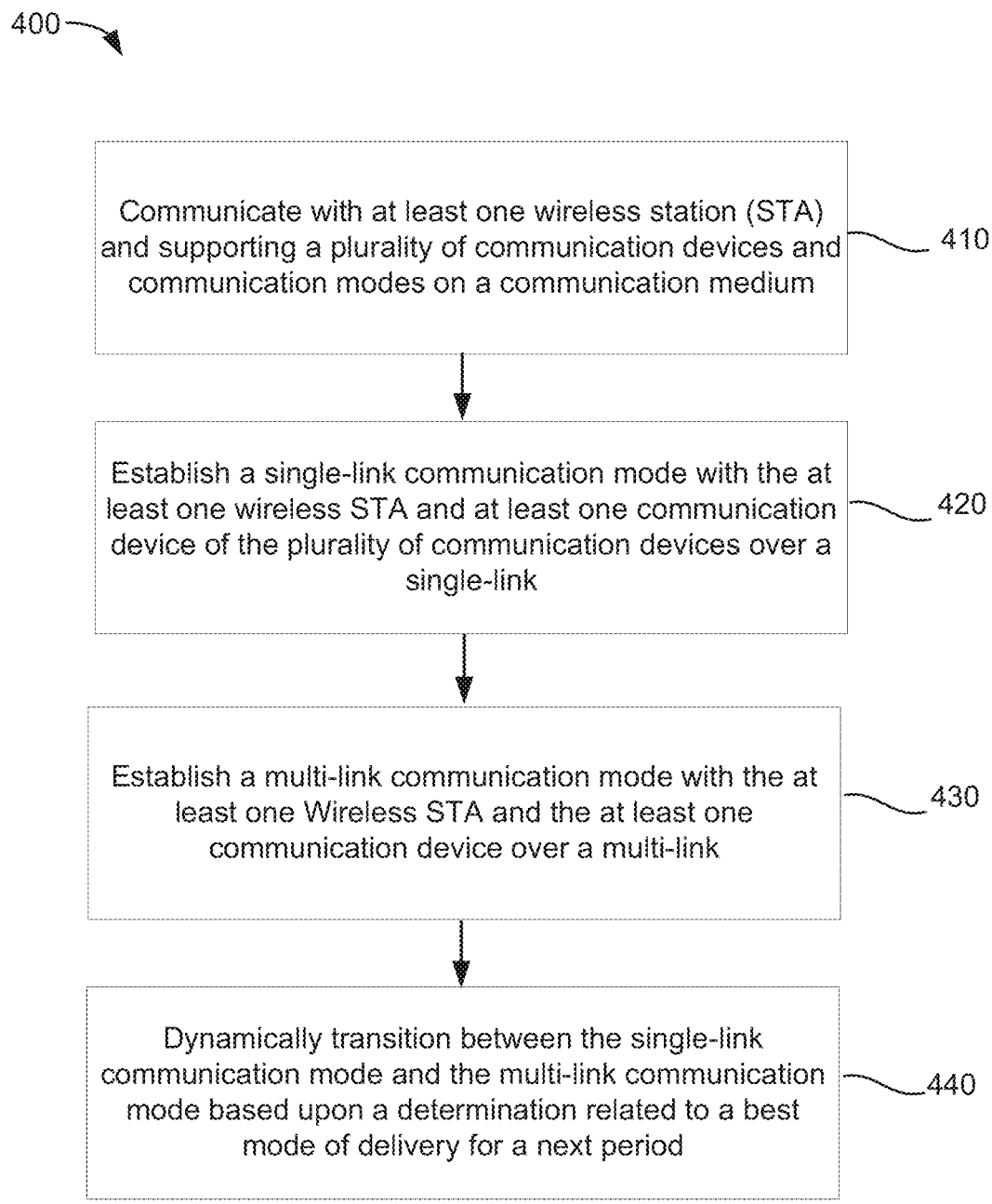
FIG. 4 illustrates an example method of wireless communication, according to aspects of the disclosure.

FIG. 4 illustrates an example method 400 of wireless communication, according to aspects of the disclosure. More specifically, the method 400 may permit a dynamic transition between a single-link and a multi-link communication mode based upon a triggering event. The usage of both single-link and double-link is a hybrid mode of operation that can also work with extremely high throughput (EHT) networks. In an aspect, the method 400 may be performed by an AP (e.g., any of the APs described herein).

At 410, the AP communicates with at least one wireless station (STA) and supports a plurality of communication devices (e.g., other STAs, other APs, etc.) and communication modes on a communication medium. In an aspect, operation 410 may be performed by the one or more short-range wireless transceivers 360, the one or more processors 384, memory 386, and/or communications manager 388, any or all of which may be considered means for performing this operation.

At 420, the AP establishes a single-link communication mode with the at least one wireless STA and at least one communication device of the plurality of communication devices over a single-link. In an aspect, operation 420 may be performed by the one or more short-range wireless transceivers 360, the one or more processors 384, memory 386, and/or communications manager 388, any or all of which may be considered means for performing this operation.

At 430, the AP establishes a multi-link communication mode with the at least one wireless STA and the at least one communication device over a multi-link. In an aspect, operation 430 may be performed by the one or more short-range wireless transceivers 360, the one or more processors 384, memory 386, and/or communications manager 388, any or all of which may be considered means for performing this operation.

At 440, the AP dynamically transitions between the single-link communication mode and the multi-link communication mode based upon a determination related to a best mode of delivery for a next period. In an aspect, operation 440 may be performed by the one or more short-range wireless transceivers 360, the one or more processors 384, memory 386, and/or communications manager 388, any or all of which may be considered means for performing this operation.

As will be appreciated, a technical advantage of the method 400 is increased medium utilization and data throughput of a wireless network associated with the AP.

Figure 5:
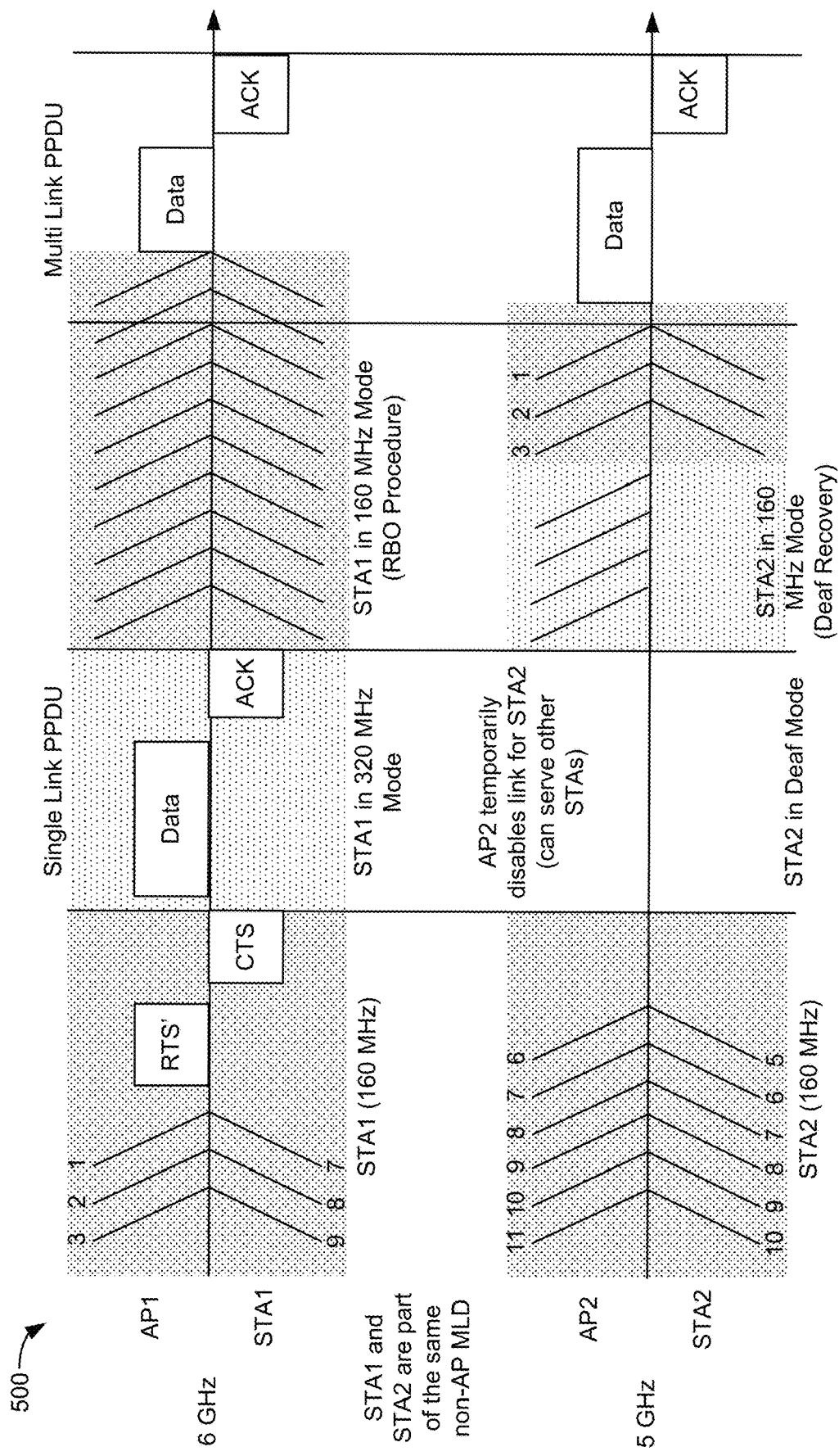
FIG. 5 is a diagram illustrating an extension to the Spatial Multiplexing Power Save (SMPS) mode in a downlink scenario, according to aspects of the disclosure.

FIG. 5 is a diagram 500 illustrating an extension to the Spatial Multiplexing Power Save (SMPS) mode in a downlink scenario, according to aspects of the disclosure. In a downlink scenario, as illustrated in FIG. 5, the SMPS mode is extended to include the following additions. The STA listens to both links using an operating bandwidth of 160 MHz. When the AP wins the 320 MHz operating bandwidth at a 6 GHz operating mode, the AP sends a request to send (RTS)/clear to send (CTS) to bring the STA to retune both radios to operate on 320 MHz, 6 GHz.

Then the AP sends RTS on 320 MHz and the STA retunes its link and sends CTS on 320 MHz. If the RTS duration is not sufficient for the STA to respond, there could be a padded RTS or another control frame such as a Trigger frame (e.g., MU RTS) that performs a similar operation. The AP will disable the second link, while the first link is active.

When the AP wins a 160 MHz operating bandwidth on either a 5 GHz or 6 GHz operating mode, it will follow a maximum-lifetime minimum-resource (MLMR) operation. It may also implement a Synchronous PPDUs/End time alignment mechanism.

Figure 6:
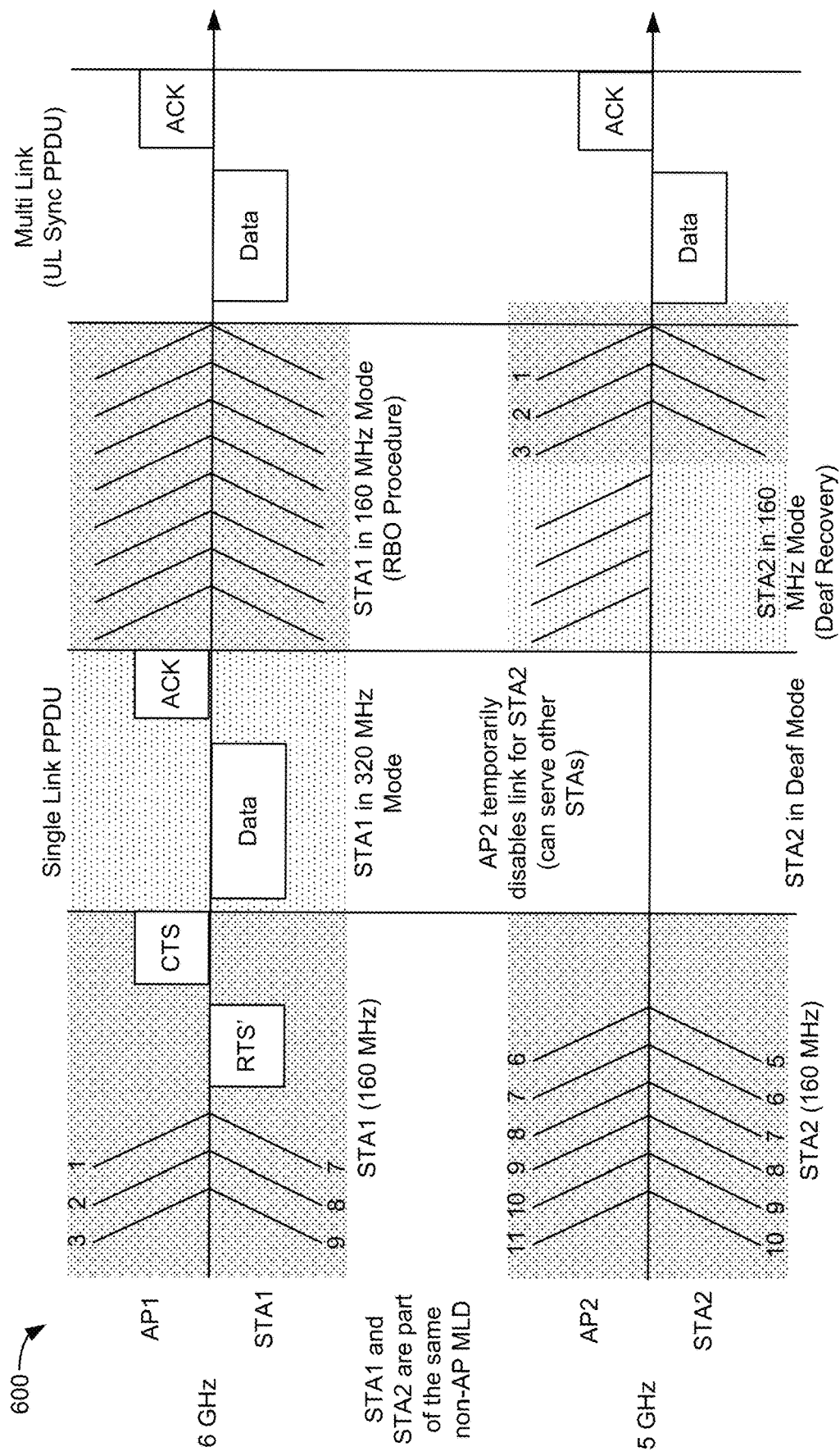
FIG. 6 is a diagram illustrating an extension to the SMPS mode in an uplink scenario, according to aspects of the disclosure.

FIG. 6 is a diagram 600 illustrating an extension to the SMPS mode in an uplink scenario, according to aspects of the disclosure. In an uplink scenario, as illustrated in FIG. 6, the SMPS mode is extended to include the following additions. The STA will perform a random back-off (RBO) procedure in both the 5 GHz and 6 GHz operating modes. If the STA wins at a 6 GHz, then the STA retunes its radio frequency (RF) to get both links on 6 GHz and also sends an RTS on a 320 MHz operating bandwidth.

If the STA wins at 5 GHz, then the current MLMR procedure is followed using a Sync PPDU/UL aggregation procedure.

The following functionality is also supported. There is a capability added from the STA to switch between single-link and multi-link PPDU. An extension to RTS is added, such as an RTS prime (RTS') or a control frame, in order to support a transition to a single-link PPDU mode. Also, after an RTS'/CTS exchange, the 5 GHz is disabled, when the PDDU is served on a single-link 6 GHz operating mode at a 320 MHz operating bandwidth.

The wireless communications system or systems described herein may support synchronous or asynchronous operation. For synchronous operation, the STAs may have similar frame timing, and transmissions from different STAs may be approximately aligned in time. For asynchronous operation, the STAs may have different frame timing, and transmissions from different STAs may not be aligned in time. The techniques described herein may be used for either synchronous or asynchronous operations.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A wireless communication method comprising: communicating between an access point (AP) and a station (STA) and supporting a plurality of communication devices and communication modes on a communication network; establishing a single-link communication mode with the STA and a communication device; establishing a multi-link communication mode with the same STA and the same communication device; and dynamically transitioning between the single-link communication mode and the multi-link communication mode based upon a triggering event.

Clause 2. The method of clause 1, wherein the triggering event is a detection of a transmission opportunity (TxOP).

Clause 3. The method of clause 2, wherein the TxOP comprises a mechanism for increasing a TxOP duration Clause 4. The method of any of clauses 2 to 3, wherein the TxOP comprises a mechanism for adjusting an access priority.

Clause 5. The method of any of clauses 1 to 4, wherein one of the supported communication modes is a Spatial Multiplexing Power Source (SMPS) mode.

Clause 6. The method of any of clauses 1 to 5, wherein during a downlink (DL) channel, the STA listens on at least two communication links.

Clause 7. The method of any of clauses 1 to 6, wherein a selected frequency is a 160 Megahertz (MHz) operating bandwidth in a 5 Gigahertz (GHz) operating mode.

Clause 8. The method of any of clauses 1 to 6, wherein a selected frequency is a 320 MHz operating bandwidth in a 6 GHz operating mode.

Clause 9. The method of any of clauses 1 to 8, wherein a single-link mode is a 320 MHz operating bandwidth in a 6 GHz operating mode.

Clause 10. The method of any of clauses 1 to 9, wherein a multi-link mode is a 320 MHz operating bandwidth in a 6 GHz operating mode plus another 160 MHz operating bandwidth on a 5 GHz operating mode.

Clause 11. The method of any of clauses 1 to 10, wherein an AP attempts to win a usage of a selected channel.

Clause 12. The method of clause 11, wherein the AP will disable a second communication link, while a first communication link is active.

Clause 13. The method any of clauses 1 to 12, wherein the AP sends a Request to Send/Clear to Send (RTS/CTS) message so that the STA can retune communication devices to operate on a common frequency.

Clause 14. The method of clause 13, wherein the AP sends an RTS on a 320 MHz operating bandwidth, the STA retunes its communication link and then sends CTS on 320 MHz operating bandwidth.

Clause 15. The method of any of clauses 13 to 14, wherein if the RTS duration is not a sufficient time delay for the STA to respond, a padded RTS is used to provide the sufficient time delay.

Clause 16. The method of clause 15, wherein a trigger frame is used to provide the sufficient time delay.

Clause 17. The method of clause 15, wherein an MU RTS command is used to provide the sufficient time delay.

Clause 18. The method of any of clauses 1 to 17, wherein if the AP wins an operating bandwidth of 160 MHz on either a 5 GHz operating mode or a 6 GHz operating mode, a maximum-lifetime minimum-resource (MLMR) operation is executed.

Clause 19. The method of any of clauses 1 to 18, wherein a physical layer protocol data unit (PPDU) implements a PPDUs/End time alignment mechanism.

Clause 20. The method of any of clauses 1 to 19, wherein during an uplink (UL) communication, the SMPS mode is extended.

Clause 21. The method of any of clauses 1 to 20, wherein the STA performs a random back off (RBO) on both of at least two frequencies.

Clause 22. The method of any of clauses 1 to 21, wherein the both of at least two operational bandwidths are 5 GHz and 6 GHz.

Clause 23. The method of any of clauses 1 to 22, wherein if the STA wins at 6 GHz, the STA will retune a radio frequency (RF) to get both communication links on a 6 GHz operation mode and then sends a request to send (RTS) on a 320 MHz operating bandwidth.

Clause 24. The method of any of clauses 1 to 23, wherein if the STA wins at a 5 GHz operation mode an MLMR procedure is performed.

Clause 25. The method of clause 24, wherein the maximum-lifetime minimum-resource (MLMR) operation uses a Sync PPDU/UL aggregation procedure.

Clause 26. The method of any of clauses 1 to 25, wherein an extension to RTS is used to transition to a single-link PPDU.

Clause 27. The method of any of clauses 1 to 25, wherein an extension to RTS prime (RTS') is used to transition to a single-link PPDU.

Clause 28. The method of any of clauses 1 to 25, wherein an extension to a control frame is used to transition to a single-link PPDU.

Clause 29. The method of any of clauses 1 to 28, wherein a 5 GHz operating mode link is disabled when a PDDU is served on a single link 6 GHz operating mode at a 320 MHz operating bandwidth.

Clause 30. The method of any of clauses 1 to 29, wherein a link is disabled after an RTS prime (RTS')/CTS exchange.

Clause 31. The method of any of clauses 1 to 30, wherein while operating in single-link mode, at least two antennas are switched to the single-link when transitioning to the single-link mode.

Clause 32. The method of clause 31, wherein both of the at least two antennas are mapped to the same single-link.

Clause 33. The method of any of clauses 31 to 32, wherein while operating in multi-link mode, one of the at least two antennas is mapped to each link of the multi-link.

Clause 34. An apparatus comprising a memory, at least one transceiver, and at least one processor communicatively coupled to the memory and the at least one transceiver, the memory, the at least one transceiver, and the at least one processor configured to perform a method according to any of clauses 1 to 33.

Clause 35. An apparatus comprising means for performing a method according to any of clauses 1 to 33.

Clause 36. A non-transitory computer-readable medium storing computer-executable instructions, the computer-executable comprising at least one instruction for causing a computer or processor to perform a method according to any of clauses 1 to 33.

Implementation examples are described in the following numbered clauses:

Clause 1. A method of wireless communication performed by an access point (AP), comprising: communicating with at least one wireless station (STA) and supporting a plurality of communication devices and communication modes on a communication medium; establishing a single-link communication mode with the at least one wireless STA and at least one communication device of the plurality of communication devices over a single-link; establishing a multi-link communication mode with the at least one wireless STA and the at least one communication device over a multi-link; and dynamically transitioning between the single-link communication mode and the multi-link communication mode based upon a determination related to a best mode of delivery for a next period.

Clause 2. The method of clause 1, wherein the best mode of delivery for the next period is determined based on antenna availability associated with the single-link and the multi-link.

Clause 3. The method of any of clauses 1 to 2, wherein the best mode of delivery for the next period is determined based on radio capabilities associated with the single-link and the multi-link and a probability of winning the communication medium.

Clause 4. The method of clause 3, wherein the radio capabilities include whether a selected frequency of the single-link communication mode or the multi-link communication mode is a 160 Megahertz (MHz) operating bandwidth in a 5 Gigahertz (GHz) operating mode.

Clause 5. The method of any of clauses 3 to 4, wherein the radio capabilities include whether a selected frequency of the single-link communication mode or the multi-link communication mode is a 320 MHz operating bandwidth in a 6 GHz operating mode.

Clause 6. The method of clause 5, further comprising: attempting to win usage of the selected frequency.

Clause 7. The method of any of clauses 5 to 6, wherein the single-link communication mode is the 320 MHz operating bandwidth in the 6 GHz operating mode.

Clause 8. The method of any of clauses 5 to 7, wherein the multi-link communication mode is the 320 MHz operating bandwidth in the 6 GHz operating mode plus another 160 MHz operating bandwidth on a 5 GHz operating mode.

Clause 9. The method of any of clauses 1 to 8, wherein the next period comprises one or more transmission opportunities (TxOPs).

Clause 10. The method of clause 9, wherein dynamically transitioning between the single-link communication mode and the multi-link communication mode comprises: increasing a duration of the one or more TxOPs.

Clause 11. The method of any of clauses 9 to 10, wherein dynamically transitioning between the single-link communication mode and the multi-link communication mode comprises: adjusting an access priority for the one or more TxOPs.

Clause 12. The method of any of clauses 1 to 11, wherein one of the single-link communication mode and the multi-link communication mode is a Spatial Multiplexing Power Source (SMPS) mode.

Clause 13. The method of clause 12, further comprising: extending the SMPS mode during uplink communication with the at least one wireless STA.

Clause 14. The method of any of clauses 1 to 13, further comprising: disabling one of the single-link communication mode and the multi-link communication mode while the other of the single-link communication mode and the multi-link communication mode is active.

Clause 15. The method of any of clauses 1 to 14, further comprising: sending a Request to Send (RTS) message or a Clear to Send (CTS) message to enable the at least one wireless STA to retune a radio frequency (RF) to operate on a common frequency.

Clause 16. The method of clause 15, further comprising: based on a duration of the RTS not being a sufficient time delay for the at least one wireless STA to respond, using a padded RTS, a trigger frame, or a multi-user RTS (MU-RTS) command to provide the sufficient time delay.

Clause 17. The method of any of clauses 1 to 16, further comprising: sending a control signal on a 320 MHz operating bandwidth; and receiving a CTS on the 320 MHz operating bandwidth based on the STA retuning a radio frequency (RF).

Clause 18. The method of clause 17, wherein the control signal comprises an MU-RTS or RTS.

Clause 19. The method of any of clauses 1 to 18, further comprising: based on the AP winning an operating bandwidth of 160 MHz on either a 5 GHz operating mode or a 6 GHz operating mode, executing a maximum-lifetime minimum-resource (MLMR) operation.

Clause 20. The method of any of clauses 1 to 19, further comprising: implementing a physical layer protocol data unit (PPDU)/end time alignment mechanism.

Clause 21. The method of clause 20, further comprising: receiving an RTS on a 320 MHz operating bandwidth based on the at least one wireless STA winning access to the communication medium at 6 GHz and retuning a radio frequency (RF) to switch the single-link communication mode and the multi-link communication mode to a 6 GHz operation mode.

Clause 22. The method of clause 21, further comprising: performing an MLMR procedure based on the at least one wireless STA winning access to the communication medium at a 5 GHz operation mode.

Clause 23. The method of clause 22, wherein the MLMR procedure uses a Sync PPDU/uplink aggregation procedure.

Clause 24. The method of any of clauses 1 to 23, wherein an extension to RTS is used to transition to a single-link PPDU.

Clause 25. The method of any of clauses 1 to 24, wherein an extension to RTS prime (RTS') is used to transition to a single-link PPDU.

Clause 26. The method of any of clauses 1 to 25, wherein an extension to a control frame is used to transition to a single-link PPDU.

Clause 27. The method of any of clauses 1 to 26, wherein a 5 GHz operating mode link is disabled when a PDDU is served on a single-link 6 GHz operating mode at a 320 MHz operating bandwidth.

Clause 28. The method of any of clauses 1 to 27, wherein one of the single-link communication mode and the multi-link communication mode is disabled after an RTS prime or CTS exchange.

Clause 29. The method of any of clauses 1 to 28, wherein, while operating in the single-link communication mode, at least two antennas of the AP are switched to the single-link when transitioning to the single-link communication mode.

Clause 30. The method of clause 29, wherein both of the at least two antennas are mapped to the single-link.

Clause 31. The method of any of clauses 29 to 30, wherein, while operating in the multi-link communication mode, one of the at least two antennas is mapped to each link of the multi-link.

Clause 32. An apparatus comprising a memory, at least one transceiver, and at least one processor communicatively coupled to the memory and the at least one transceiver, the memory, the at least one transceiver, and the at least one processor configured to perform a method according to any of clauses 1 to 31.

Clause 33. An apparatus comprising means for performing a method according to any of clauses 1 to 31.

Clause 34. A non-transitory computer-readable medium storing computer-executable instructions, the computer-executable comprising at least one instruction for causing a computer or processor to perform a method according to any of clauses 1 to 31.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by an access point (AP), comprising:
communicating with at least one wireless station (STA) and supporting a plurality of communication devices and communication modes on a communication medium;
establishing a single-link communication mode with the at least one wireless STA in a first operating bandwidth;
establishing a multi-link communication mode with the at least one wireless STA in at least a second operating bandwidth and a third operating bandwidth;
dynamically transitioning between the single-link communication mode and the multi-link communication mode based upon a determination related to a best mode of delivery for a next period;
performing a contention-based channel access procedure to gain access to a selected operating bandwidth of the first operating bandwidth, the second operating bandwidth, or the third operating bandwidth;
sending, based on gaining access to the selected operating bandwidth, a control signal on the first operating bandwidth of the single-link communication mode to enable the at least one wireless STA to retune at least one radio to operate on the first operating bandwidth; and
disabling the multi-link communication mode having either the second operating bandwidth or the third operating bandwidth when a physical layer protocol data unit (PDDU) is served on the first operating bandwidth of the single-link communication mode,
wherein the first operating bandwidth of the single-link communication mode is greater than or equal to the second operating bandwidth or the third operating bandwidth of the multi-link communication mode.

2. The method of claim 1, wherein the best mode of delivery for the next period is determined based on antenna availability associated with the single-link communication mode and the multi-link communication mode.

3. The method of claim 1, wherein the best mode of delivery for the next period is determined based on radio capabilities associated with the single-link communication mode and the multi-link communication mode and a probability of winning the communication medium.

4. The method of claim 3, wherein the radio capabilities include whether the selected operating bandwidth of the single-link communication mode or the multi-link communication mode is a 160 Megahertz (MHz) operating bandwidth in a 5 Gigahertz (GHz) operating mode.

5. The method of claim 3, wherein the radio capabilities include whether the selected operating bandwidth of the single-link communication mode or the multi-link communication mode is a 320 MHz operating bandwidth in a 6 GHz operating mode.

6. The method of claim 5, further comprising:
attempting to win usage of the selected operating bandwidth.

7. The method of claim 5, wherein the single-link communication mode is the 320 MHz operating bandwidth in the 6 GHz operating mode.

8. The method of claim 5, wherein the multi-link communication mode is the 320 MHz operating bandwidth in the 6 GHz operating mode plus another 160 MHz operating bandwidth on a 5 GHz operating mode.

9. The method of claim 1, wherein the next period comprises one or more transmission opportunities (TxOPs).

10. The method of claim 9, wherein dynamically transitioning between the single-link communication mode and the multi-link communication mode comprises:
increasing a duration of the one or more TxOPs.

11. The method of claim 9, wherein dynamically transitioning between the single-link communication mode and the multi-link communication mode comprises:
adjusting an access priority for the one or more TxOPs.

12. The method of claim 1, wherein one of the single-link communication mode and the multi-link communication mode is a Spatial Multiplexing Power Save (SMPS) mode.

13. The method of claim 12, further comprising:
extending the SMPS mode during uplink communication with the at least one wireless STA.

14. The method of claim 1, further comprising:
disabling one of the single-link communication mode and the multi-link communication mode while the other of the single-link communication mode and the multi-link communication mode is active.

15. The method of claim 1, further comprising:
based on a duration of the control signal not being a sufficient time delay for the at least one wireless STA to respond, using a padded Request to Send (RTS) message, a trigger frame, or a multi-user RTS (MU-RTS) command to provide the sufficient time delay.

16. The method of claim 1, further comprising:
sending a control signal on a 320 MHz operating bandwidth; and
receiving a response to the control signal on the 320 MHz operating bandwidth based on the at least one wireless STA retuning a radio frequency (RF).

17. The method of claim 16, wherein:
the control signal is a Request to Send (RTS) message, and the response to the control signal is a Clear to Send (CTS) message.

18. The method of claim 1, wherein the control signal comprises an MU-RTS or RTS.

19. The method of claim 1, further comprising:
based on the AP winning an operating bandwidth of 160 MHz on either a 5 GHz operating mode or a 6 GHz operating mode, executing the multi-link communication mode.

20. The method of claim 1, further comprising:
implementing a physical layer protocol data unit (PPDU)/end time alignment mechanism.

21. The method of claim 20, further comprising:
receiving an RTS on a 320 MHz operating bandwidth based on the at least one wireless STA winning access to the communication medium at 6 GHz and retuning a radio frequency (RF) to switch the single-link communication mode or the multi-link communication mode to a 6 GHz operation mode.

22. The method of claim 21, further comprising:
performing a multi-link communication mode procedure based on the at least one wireless STA winning access to the communication medium at a 5 GHz operation mode.

23. The method of claim 22, wherein the multi-link communication mode procedure uses a Sync PPDU/uplink aggregation procedure.

24. The method of claim 1, wherein an extension to RTS is used to transition to a single-link PPDU.

25. The method of claim 1, wherein an extension to RTS prime (RTS') is used to transition to a single-link PPDU.

26. The method of claim 1, wherein an extension to a control frame is used to transition to a single-link PPDU.

27. The method of claim 1, wherein a 5 GHz operating mode link is disabled when a PDDU is served on a single-link 6 GHz operating mode at a 320 MHz operating bandwidth.

28. The method of claim 1, wherein one of the single-link communication mode and the multi-link communication mode is disabled after an RTS prime or CTS exchange.

29. The method of claim 1, wherein, while operating in the single-link communication mode, at least two antennas of the AP are switched to a single-link when transitioning to the single-link communication mode.

30. The method of claim 29, wherein both of the at least two antennas are mapped to the single-link communication mode.

31. The method of claim 29, wherein, while operating in the multi-link communication mode, one of the at least two antennas is mapped to each link of the multi-link communication mode.

32. An access point (AP), comprising:
at least one memory;
at least one transceiver; and
at least one processor communicatively coupled to the at least one memory and the at least one transceiver, the at least one processor configured to:
communicate, via the at least one transceiver, with at least one wireless station (STA) and supporting a plurality of communication devices and communication modes on a communication medium;
establish a single-link communication mode with the at least one wireless STA in a first operating bandwidth or a second operating bandwidth;
establish a multi-link communication mode with the at least one wireless STA in at least a second operating bandwidth and a third operating bandwidth;
dynamically transition between the single-link communication mode and the multi-link communication mode based upon a determination related to a best mode of delivery for a next period;
perform a contention-based channel access procedure to gain access to a selected operating bandwidth of the first operating bandwidth, the second operating bandwidth, or the third operating bandwidth;
send, via the at least one transceiver, based on gaining access to the selected operating bandwidth, a control signal on the first operating bandwidth of the single-link communication mode to enable the at least one wireless STA to retune at least one radio to operate on the first operating bandwidth; and
disable the multi-link communication mode having either the second operating bandwidth or the third operating bandwidth when a physical layer protocol data unit (PDDU) is served on the first operating bandwidth of the single-link communication mode,
wherein the first operating bandwidth of the single-link communication mode is greater than or equal to the second operating bandwidth or the third operating bandwidth of the multi-link communication mode.

33. The AP of claim 32, wherein the best mode of delivery for the next period is determined based on antenna availability associated with the single-link communication mode and the multi-link communication mode.

34. The AP of claim 32, wherein the best mode of delivery for the next period is determined based on radio capabilities associated with the single-link communication mode and the multi-link communication mode and a probability of winning the communication medium.

35. The AP of claim 34, wherein the radio capabilities include whether the selected operating bandwidth of the single-link communication mode or the multi-link communication mode is a 160 Megahertz (MHz) operating bandwidth in a 5 Gigahertz (GHz) operating mode.

36. The AP of claim 34, wherein the radio capabilities include whether the selected operating bandwidth of the single-link communication mode or the multi-link communication mode is a 320 MHz operating bandwidth in a 6 GHz operating mode.

37. The AP of claim 36, wherein the at least one processor is further configured to:
attempt to win usage of the selected operating bandwidth.

38. The AP of claim 36, wherein the single-link communication mode is the 320 MHz operating bandwidth in the 6 GHz operating mode.

39. The AP of claim 36, wherein the multi-link communication mode is the 320 MHz operating bandwidth in the 6 GHz operating mode plus another 160 MHz operating bandwidth on a 5 GHz operating mode.

40. The AP of claim 32, wherein the next period comprises one or more transmission opportunities (TxOPs).

41. The AP of claim 35, wherein the at least one processor configured to dynamically transition between the single-link communication mode and the multi-link communication mode comprises the at least one processor configured to:
increase a duration of the one or more TxOPs.

42. The AP of claim 35, wherein the at least one processor configured to dynamically transition between the single-link communication mode and the multi-link communication mode comprises the at least one processor configured to:
adjust an access priority for the one or more TxOPs.

43. The AP of claim 32, wherein one of the single-link communication mode and the multi-link communication mode is a Spatial Multiplexing Power save (SMPS) mode.

44. The AP of claim 43, wherein the at least one processor is further configured to:
extend the SMPS mode during uplink communication with the at least one wireless STA.

45. The AP of claim 32, wherein the at least one processor is further configured to:
disable one of the single-link communication mode and the multi-link communication mode while the other of the single-link communication mode and the multi-link communication mode is active.

46. The AP of claim 32, wherein the at least one processor is further configured to:
use, based on a duration of the control signal not being a sufficient time delay for the at least one wireless STA to respond, a padded Request to Send (RTS) message, a trigger frame, or a multi-user RTS (MU-RTS) command to provide the sufficient time delay.

47. The AP of claim 32, wherein the at least one processor is further configured to:
send, via the at least one transceiver, a control signal on a 320 MHz operating bandwidth; and
receive, via the at least one transceiver, a response to the control signal on the 320 MHz operating bandwidth based on the at least one wireless STA retuning a radio frequency (RF).

48. The AP of claim 47, wherein:
the control signal is a Request to Send (RTS) message, and
the response to the control signal is a Clear to Send (CTS) message.

49. The AP of claim 32, wherein the control signal comprises an MU-RTS or RTS.

50. The AP of claim 32, wherein the at least one processor is further configured to:
execute, based on the AP winning an operating bandwidth of 160 MHz on either a 5 GHz operating mode or a 6 GHz operating mode, the multi-link communication mode.

51. The AP of claim 32, wherein the at least one processor is further configured to:
implement a physical layer protocol data unit (PPDU)/end time alignment mechanism.

52. The AP of claim 51, wherein the at least one processor is further configured to:
receive, via the at least one transceiver, an RTS on a 320 MHz operating bandwidth based on the at least one wireless STA winning access to the communication medium at 6 GHz and retuning a radio frequency (RF) to switch the single-link communication mode or the multi-link communication mode to a 6 GHz operation mode.

53. The AP of claim 52, wherein the at least one processor is further configured to:
perform a multi-link communication mode procedure based on the at least one wireless STA winning access to the communication medium at a 5 GHz operation mode.

54. The AP of claim 53, wherein the multi-link communication mode procedure uses a Sync PPDU/uplink aggregation procedure.

55. The AP of claim 32, wherein an extension to RTS is used to transition to a single-link PPDU.

56. The AP of claim 32, wherein an extension to RTS prime (RTS') is used to transition to a single-link PPDU.

57. The AP of claim 32, wherein an extension to a control frame is used to transition to a single-link PPDU.

58. The AP of claim 32, wherein a 5 GHz operating mode link is disabled when a PDDU is served on a single-link 6 GHz operating mode at a 320 MHz operating bandwidth.

59. The AP of claim 32, wherein one of the single-link communication mode and the multi-link communication mode is disabled after an RTS prime or CTS exchange.

60. The AP of claim 32, wherein, while operating in the single-link communication mode, at least two antennas of the AP are switched to a single-link when transitioning to the single-link communication mode.

61. The AP of claim 60, wherein both of the at least two antennas are mapped to the single-link communication mode.

62. The AP of claim 60, wherein, while operating in the multi-link communication mode, one of the at least two antennas is mapped to each link of the multi-link communication mode.

63. An access point (AP), comprising:
means for communicating with at least one wireless station (STA) and supporting a plurality of communication devices and communication modes on a communication medium;
means for establishing a single-link communication mode with the at least one wireless STA in a first operating bandwidth or a second operating bandwidth;
means for establishing a multi-link communication mode with the at least one wireless STA in at least a second operating bandwidth and a third operating bandwidth;
means for dynamically transitioning between the single-link communication mode and the multi-link communication mode based upon a determination related to a best mode of delivery for a next period;
means for performing a contention-based channel access procedure to gain access to a selected operating bandwidth of the first operating bandwidth, the second operating bandwidth, or the third operating bandwidth;
means for sending, based on gaining access to the selected operating bandwidth, a control signal on the first operating bandwidth of the single-link communication mode to enable the at least one wireless STA to retune at least one radio to operate on the first operating bandwidth; and
means for disabling the multi-link communication mode having either the second operating bandwidth or the third operating bandwidth when a physical layer protocol data unit (PDDU) is served on the first operating bandwidth of the single-link communication mode,
wherein the first operating bandwidth of the single-link communication mode is greater than or equal to the second operating bandwidth or the third operating bandwidth of the multi-link communication mode.

64. A non-transitory computer-readable medium storing computer-executable instructions that, when executed by an access point (AP), cause the AP to:
communicate with at least one wireless station (STA) and supporting a plurality of communication devices and communication modes on a communication medium;
establish a single-link communication mode with the at least one wireless STA in a first operating bandwidth or a second operating bandwidth;
establish a multi-link communication mode with the at least one wireless STA in at least a second operating bandwidth and a third operating bandwidth;
dynamically transition between the single-link communication mode and the multi-link communication mode based upon a determination related to a best mode of delivery for a next period;
perform a contention-based channel access procedure to gain access to a selected operating bandwidth of the first operating bandwidth, the second operating bandwidth, or the third operating bandwidth;
send, based on gaining access to the selected operating bandwidth, a control signal on the first operating bandwidth of the single-link communication mode to enable the at least one wireless STA to retune at least one radio to operate on the first operating bandwidth; and
disabling the multi-link communication mode having either the second operating bandwidth or the third operating bandwidth when a physical layer protocol data unit (PDDU) is served on the first operating bandwidth of the single-link communication mode,
wherein the first operating bandwidth of the single-link communication mode is greater than or equal to the second operating bandwidth or the third operating bandwidth of the multi-link communication mode.

\* \* \* \* \*